US007918394B1

(12) United States Patent
Morley, Jr.

(10) Patent No.: US 7,918,394 B1
(45) Date of Patent: Apr. 5, 2011

(54) CARD READER DEVICE FOR A CELL PHONE AND METHOD OF USE

(75) Inventor: Robert E. Morley, Jr., University City, MO (US)

(73) Assignee: REM Holdings 3, LLC, St. Louis, MO (US)

( * ) Notice: Subject to any disclaimer, the term of this patent is extended or adjusted under 35 U.S.C. 154(b) by 0 days.

(21) Appl. No.: 12/807,064

(22) Filed: Aug. 26, 2010

Related U.S. Application Data

(63) Continuation of application No. 12/456,134, filed on Jun. 10, 2009, now Pat. No. 7,810,729.

(51) Int. Cl.
*G06K 7/08* (2006.01)
*G06K 7/00* (2006.01)

(52) U.S. Cl. .................. 235/449; 235/435; 235/439
(58) Field of Classification Search .................. 235/375, 235/435, 439, 449, 451
See application file for complete search history.

(56) References Cited

U.S. PATENT DOCUMENTS

| | | | |
|---|---|---|---|
| 4,845,740 A | 7/1989 | Tokuyama et al. | |
| 5,764,742 A | 6/1998 | Howard et al. | |
| 5,850,599 A | 12/1998 | Seiderman | |
| 6,129,277 A | 10/2000 | Grant et al. | |
| 6,481,623 B1 | 11/2002 | Grant et al. | |
| 6,579,728 B2 | 6/2003 | Grant et al. | |
| 7,252,232 B2 | 8/2007 | Fernandes et al. | |
| 7,810,729 B2 * | 10/2010 | Morley, Jr. | 235/449 |
| 2004/0204074 A1 | 10/2004 | Desai | |
| 2005/0247787 A1 * | 11/2005 | Von Mueller et al. | 235/449 |
| 2008/0059370 A1 | 3/2008 | Sada et al. | |
| 2008/0059375 A1 | 3/2008 | Abifaker | |

FOREIGN PATENT DOCUMENTS

WO WO 2010/097711 A2 9/2010
WO WO 2010/111130 A2 9/2010

OTHER PUBLICATIONS

Luis Padilla Visdomine, "Turning your mobile into a magnetic stripe reader", posting from www.gae.ucm.es/~padilla/extrawork/mobilesoundtrack.html dated Aug. 30, 2004, 2 pgs.
Luis Padilla Visdomine, "The simplest magnetic stripe reader", posting from www.gae.ucm.es/~padilla/extrawork/soundtrack.html dated Aug. 30, 2004, 3 pages.

* cited by examiner

*Primary Examiner* — Michael G Lee
*Assistant Examiner* — Matthew Mikels
(74) *Attorney, Agent, or Firm* — David H. Chervitz

(57) ABSTRACT

A card reader device for reading a card having data stored on a magnetic stripe incorporated into the card is disclosed in which the card reader device comprises a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, and an output jack adapted to be inserted into a microphone input associated with a cell phone for providing the signal indicative of data stored on a magnetic stripe to a cell phone. Data stored on the card and sensed by the card reader device is decoded by components such as a microphone amplifier, an analog to digital converter, and a microprocessor already resident in a cell phone.

20 Claims, 4 Drawing Sheets

CARD READER DEVICE FOR A CELL PHONE AND METHOD OF USE

RELATED APPLICATION

This application is a continuation application of U.S. patent application Ser. No. 12/456,134, which was filed on Jun. 10, 2009 now U.S. Pat. No. 7,810,729.

BACKGROUND

This disclosure relates to a card reader device for use with a cellular phone for reading a magnetic stripe card and more particularly to a portable card reader device which senses the magnetically recorded information stored on a magnetic stripe card and conveys this sensed information via an analog waveform to a cell phone for further processing.

Plastic cards having a magnetic stripe embedded on one side of the card are prevalent in every day commerce. These cards are used in various transactions such as to pay for purchases by using a credit card, a debit card, or a gasoline charge card. A charge card or a debit card may also be used to transact business with a bank through use of an automated teller machine (ATM). The magnetic stripe card is capable of storing data by modifying the magnetism of magnetic particles embedded in the stripe. The data stored on the magnetic stripe may be sensed or read by swiping the stripe past a read head. The analog waveform obtained by sensing the magnetic stripe must undergo a process known as decoding to obtain the digital information stored in the magnetic stripe of the card. Conventional magnetic stripe card readers are comprised of both relatively simple sensing components as well as the more costly and complex decoding and communication components.

It is typical in a magnetic stripe card to locate the magnetic stripe 0.223 inches from an edge of the card with the stripe being 0.375 inches wide. The magnetic stripe contains up to three tracks of digital data with each track being 0.110 inches wide. Tracks one and three are typically recorded at 210 bits per inch, while track two typically has a recording density of 75 bits per inch. Each track can either contain 7-bit alphanumeric characters, or 5-bit numeric characters. Track one standards were created by the airlines industry, the International Air Transport Association. Track one can contain information reserved for the bank that issued the card and magnetically encoded data like the primary account number, the user's name, a country code, an expiration date for the card, and 79 characters of discretionary data, all mixed in with separators and other specialized computer characters. The second track, the track most commonly used, is in a format defined by the American Bankers Association. The second track can contain the primary account number, the country code, the card's expiration date, 40 characters of discretionary data, and separator characters. The third track is in a format called THRIFT and was originally intended for use with ATMs. Unlike tracks one and two, which are read only tracks, the third track was intended for read and write applications. However, for the most part, the third track is hardly ever used. Further, the International Organization for Standardization (ISO), an international-standard setting body, has a set of standards for describing the physical dimensions and recording technique on identification cards which are known as ISO 7810 and 7811.

Magnetic stripe cards having these standard specifications can typically be read by point-of-sale devices at a merchant's location. When the card is swiped through an electronic card reader at the checkout counter at a merchant's store, the reader will usually use its built-in modem to dial the number of a company that handles credit authentication requests. Once the account is verified and an approval signal will be sent back to the merchant to complete a transaction.

Although magnetic stripe cards are universally used by merchants there is no way for an individual to take advantage of the card to receive a payment from another individual (who is not a merchant) by swiping the card through a simple reader attached to his cell phone. For example, one individual may owe another person money for a debt, but one way to pay the debt is to provide cash or a check. It would be convenient to be able to use a credit card or a debit card to pay off the debt. In addition, it is advantageous for an individual to make payment to another individual or merchant by swiping his magnetic stripe card through a reader connected to a cell phone. However, there is presently no way for an individual to send payment to an individual or merchant through the use of a magnetic stripe card by using a simple magnetic stripe card reader connected to a cell phone.

Therefore, it would be desirable to have a simple card reader device that would allow an individual to receive or send payment through the use of a magnetic stripe card. It is also desirable to provide a simple portable card reader device that can be connected to a cell phone with the cell phone providing the decoding function for the sensed magnetic stripe information as well as acting as a point-of-sale device. The cell phone can have an application programmed therein to decode data contained on a magnetic stripe to submit the card data to a company or a third party that handles credit authentication requests.

BRIEF SUMMARY

In one form of the present disclosure, a card reader device for reading a card having data stored on a magnetic stripe incorporated into the card the card reader device comprises a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, and an output jack adapted to be inserted into a microphone input associated with a cell phone for providing the signal indicative of data stored on a magnetic stripe to a cell phone, wherein application software resident on the cell phone directs the processor of the cell phone to decode the signal provided to the microphone input to produce the digital data stored on the card.

In another form of the present disclosure, a card reader device for reading a card having data stored on a magnetic stripe incorporated into the card in which the device comprises a read head for passing a magnetic stripe of a card by to read data stored on a magnetic stripe and for producing a signal indicative of data stored on a magnetic stripe, an amplifier for amplifying the signal indicative of data stored on a magnetic stripe, and an output jack adapted to be inserted into an input associated with a cell phone for providing the signal indicative of data stored on a magnetic stripe to a cell phone, wherein application software resident on the cell phone directs the processor of the cell phone to decode the signal provided to the audio or line input to produce the digital data stored on the card.

In yet another form of the present disclosure, a method for reading a card having data stored on a magnetic stripe incorporated into the card is disclosed in which the method comprises the steps of providing a card reader device comprising a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, an output jack adapted to be inserted into a microphone input associated with a cell phone for providing the signal indicative of data stored on a magnetic stripe to a cell phone, passing a card having data stored on a magnetic stripe incorporated into the card by the card reader device, and providing the signal indicative of data stored on a magnetic stripe to a cell phone for processing by circuitry contained in a cell phone.

In light of the foregoing comments, it will be recognized that a principal object of the present disclosure is to provide a card reader device comprised of a very simple external device to be used in conjunction with a cell phone with application software provided to perform the decoding function.

A further object of the present disclosure is to provide a card reader device that can read and decode data stored on a magnetic stripe card by sensing the recorded data waveform and transmitting the data waveform to a cell phone where it is decoded with built in circuitry and application software provided.

Another object of the present disclosure is to provide a card reader device that can read one or more tracks of data stored on a magnetic stripe card.

A further object of the present disclosure is to provide a card reader device that is of simple construction and design and which can be easily employed with highly reliable results.

A still further object of the present disclosure is to provide a card reader device that can be easily carried or stored.

Another object of the present disclosure is to provide a card reader device that does not require any source of power.

Another object of the present disclosure is to provide a card reader device that may be constructed in various shapes, designs, or forms.

A still further object of the present disclosure is to provide a card reader device that can amplify data read from a magnetic stripe card. In some constructions an amplifier resident in a card reader device may require power which may be provided by a cell phone.

Another object of the present disclosure is to provide a card reader device that can operate with existing magnetic stripe cards.

Yet still another object of the present disclosure is to provide a card reader device that can provide a signal indicative of data stored in a magnetic stripe and application software to a cell phone for the cell phone to decode the signal indicative of data stored in a magnetic stripe to be processed to transact commerce.

These and other objects and advantages of the present disclosure will become apparent after considering the following detailed specification in conjunction with the accompanying drawings, wherein:

DETAILED DESCRIPTION OF PREFERRED EMBODIMENTS

Figure 1:
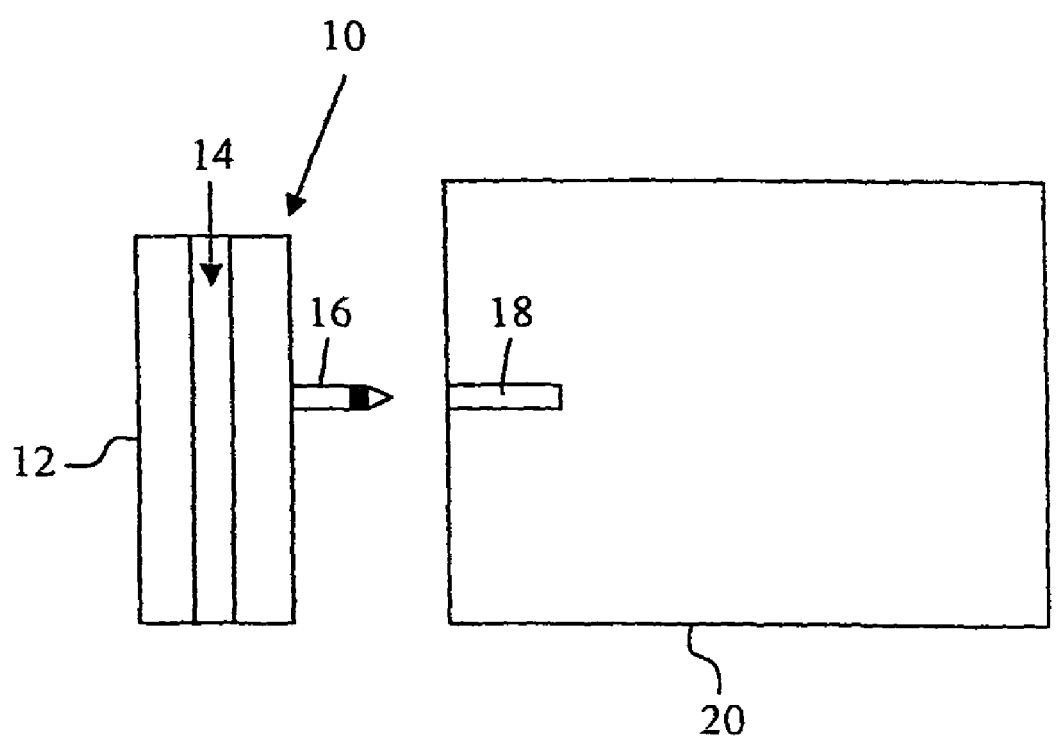
FIG. 1 is a side perspective view of a card reader device constructed according to the present disclosure.

Referring now to the drawings, wherein like numbers refer to like items, number 10 identifies a preferred embodiment of a card reader device constructed according to the present disclosure. With reference now to FIG. 1, the card reader device 10 is shown to comprise a housing 12 having a slot 14 and an output jack 16 extending out from the housing 12. The jack 16 is adapted to be inserted into a socket 18 such as a microphone input or a line in audio input of a cell phone 20. The jack 16 may be a TRS (tip, ring, sleeve) connector also known as an audio jack, phone plug, jack plug, stereo plug, mini-jack, or mini-stereo audio connector. The jack 16 may be formed of different sizes such as miniaturized versions that are 3.5 mm or 2.5 mm. It is also possible and contemplated that the jack 16 may be retractable within the housing 12.

The slot 14 is wide enough and deep enough to accept a card having a magnetic stripe. In particular, the slot 14 is deep enough that the magnetic stripe will fit within the slot 14. The slot 14 also has a length that is less than the length of the card to be inserted into the slot 14. However, it is also possible and contemplated that the slot 14 may have other lengths if desired, for a given application. The housing 12 may take on different shapes and sizes, as will be discussed further herein.

Figure 2:
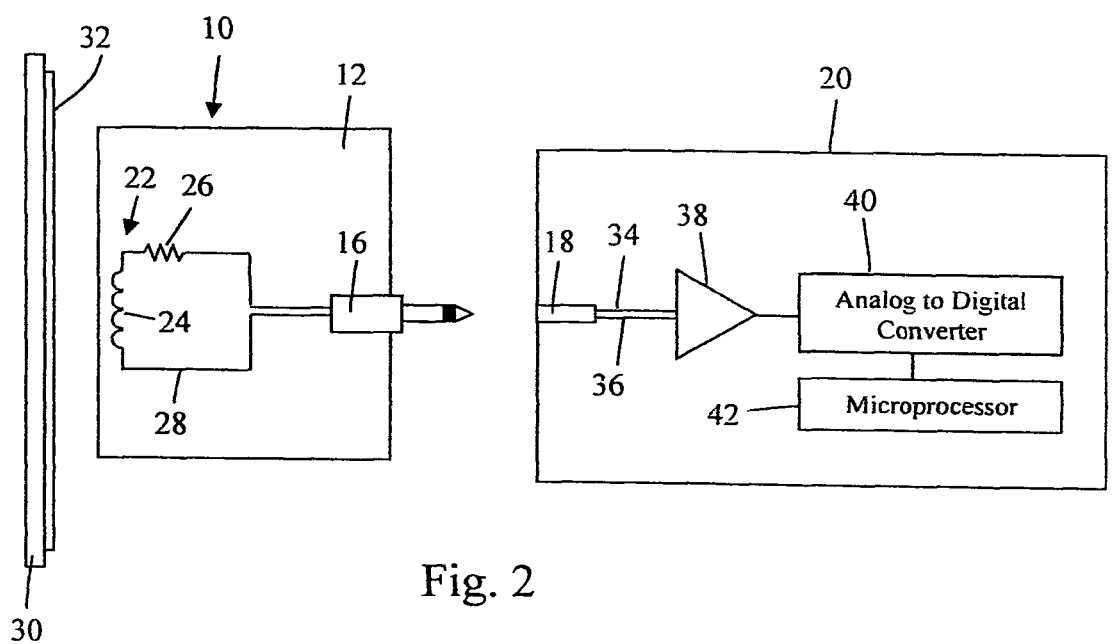
FIG. 2 is a schematic diagram of a card reader device constructed according to the present disclosure.

FIG. 2 illustrates a schematic diagram of the card reader device 10. The card reader device 10 comprises a read head 22, such as an inductive pickup head, having a coil 24 connected to a signal amplitude setting device 26 such as a resistor which is connected to the jack 16. A lead 28 connects the jack 16 to the coil 24 to complete the circuit. A card 30, such as a credit card, has a magnetic stripe 32 associated with the card 30. As has been previously discussed, the magnetic stripe 32 may have three tracks with each of the tracks containing data. The card reader device 10 is capable of reading one track, usually track two, when the device 10 is connected to the microphone input of the cell phone 20. As the magnetic stripe 32 of the card 30 is passed by the read head 22 the read head 22 reads data or information stored in the magnetic stripe 32. Although not shown, the card 30 is inserted into the slot 14 in the housing 12 and the card 30 is swiped or passed by the read head 22. Data stored in the magnetic stripe 32 may be in the form of magnetic transitions as described in the ISO 7811 standards. As the card 30 moves past the read head 22, magnetic transitions representing data induce a voltage in the coil 24. A voltage signal or waveform produced by the coil 24 is provided to the resistor 26 with the resistor setting the amplitude of the waveform. This waveform is sent via the jack 16 into the microphone input socket 18 of the cell phone 20. A pair of wires 34 and 36 connect the socket 18 to an amplifier 38. The amplifier 38 amplifies the waveform received from the card reader device 10. The amplified waveform is provided to an analog to digital converter device (ADC) 40 where the waveform in analog form is converted into digital samples of the analog waveform. The digital samples are sent to a microprocessor 42 for further processing, as will be explained. For the sake of clarity and brevity most of the components of the cell phone 20 have not been shown. However, the cell phone 20 may also include such components as memory including flash ROM, SRAM, a camera, a battery, LCD driver, a display, an antenna, a speaker, a Bluetooth circuit, and WIFI circuitry. The flash ROM may contain programs, applications, and/or an operating system for the cell phone 20.

The card reader device 10 is capable of being connected to the cell phone 20 for providing data stored in the magnetic stripe 32 of a card 30. Once connected any magnetic stripe 32 that is swiped in the slot 14 is read by the read head 22. The magnetic read head 22 generates an analog waveform that results from changes in magnetization along the stripe 32 relative to the movement between the read head 22 and the stripe 32. The resistor 26 sets the amplitude of this signal and this signal is provided to the cell phone 20. This signal is then amplified by the amplifier 38 contained in the cell phone 20. The ADC 40 of the cell phone 20 samples the amplified analog waveform at a given sampling rate and generates a stream of digital values or samples. These digital samples are processed by the processor 42 that can in turn provide information to a host system such as a third party or a company that handles credit authentication requests. The processor 42 can communicate with the host system via the cell phone network, WIFI, Bluetooth or any other mode available to it. The host system may also send a signal to the cell phone 20 to indicate that the transaction has been completed. The processor 42 may be controlled by a program or an application stored in memory or in a program storage area. The program or application can be programmed to decode digital samples received from the ADC 40 and use the decoded signals to contact a third party for authorizing a transaction. In this manner, a payment from the cardholder's account can be transferred to the cell phone owner's account or allow the cell phone owner to transfer payment to a merchant that accepts credit card transactions.

Figure 3:
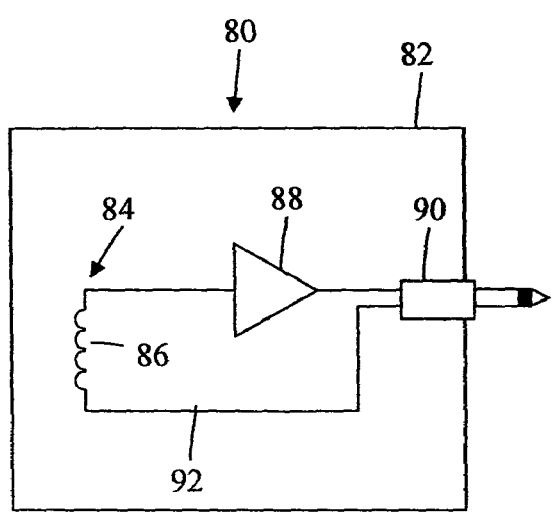
FIG. 3 is a schematic diagram of another embodiment of a card reader device constructed according to the present disclosure.

With reference now to FIG. 3, another embodiment of a card reader device 80 is illustrated. The card reader device 80 comprises a housing 82 having an inductive read head 84 with coil 86 connected to an amplifier 88 which is connected to an output jack 90. The output jack 90 extends out of the housing 82 and is adapted to be inserted into a line in audio input or a stereo line in input associated with a cell phone (not shown). A wire 92 connects the jack 90 to the coil 86. Although not shown in this particular drawing, a slot is formed in the housing 82 near the coil 86 to allow a card having a magnetic stripe to be passed by the coil 86. Data or information stored in the magnetic stripe is read by the coil 86. The coil 86 produces a waveform indicative of data stored in the magnetic stripe and this waveform is provided to the amplifier 86. The amplified waveform is then transmitted to the cell phone via the jack 88. The amplified waveform may be provided to an ADC device for converting into digital samples to be processed by a microprocessor in the cell phone. Once processed, the cell phone may contact a third party for processing a transaction in either direction (i.e., to or from the cell phone owner's account).

Since the card reader device 80 uses the line in audio input of the cell phone, the card reader device 80 is capable of transmitting two tracks from the card being read. As has been previously discussed, a magnetic stripe may have up to three tracks with each of the tracks containing data. For example, the card reader device 80 may read tracks one and two and send these signals to the cell phone as the left and right channels of a stereo signal. However, with the card reader device 80 any two of the three tracks, usually tracks one and two, may be read and decoded when the card reader device 80 is connected to the stereo line in inputs. In some situations or constructions, it is possible that the amplifier 88 may need to be powered. The amplifier 88 may be powered from a power source resident in the cell phone to which the device 80 is connected.

Figure 4:
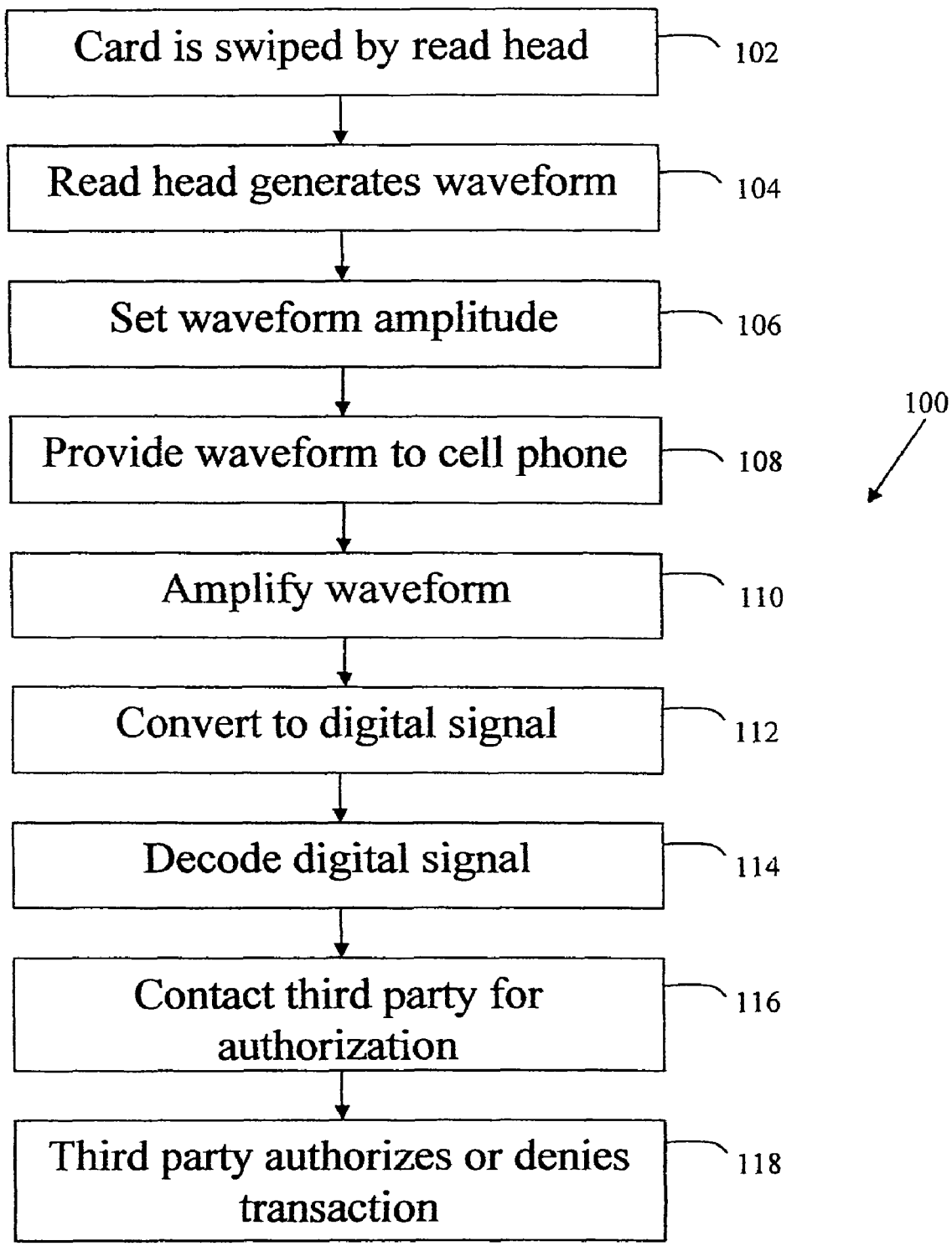
FIG. 4 is a flowchart of a method of operation of a card reader device constructed according to the present disclosure.

FIG. 4 illustrates a flowchart diagram of a method of operation 100 of the card reader device 10. The method 100 begins operation at a step 102 in which a magnetic stripe card 30 is swiped through the slot 14. In a next step 104, the read head 22 reads data stored in the magnetic stripe 32 and generates an analog signal or waveform indicative of data stored in the magnetic stripe 32. The waveform then has its amplitude set by the resistor 26 in a step 106. Next, in a step 108, the set waveform is provided to the cell phone 20 via the output jack 16 through the socket 18. In a next step 110, the amplifier 38 amplifies the set waveform. The waveform is provided to the analog to digital converter device 40 for conversion to a digital signal in a step 112. An application or a program in the cell phone 20 decodes the digital signal in a next step 114. In a next step 116, the program contacts a third party to authorize a transaction using the decoded signal. The third party either authorizes or denies the transaction in a last step 118. For example, if the third party authorizes the transaction then money deducted from the account of the cardholder is transferred into an account associated with the cell phone owner or vice versa. In this way, a debt can be collected or paid by use of the card reader device 10. Further, the card reader devices 10 or 80 may be employed to transact a one-way transaction in which money can be credited to an account. In essence, the card reader devices 10 or 80 allow a user to become either a micro-merchant (payee) or a customer (payer) without having to purchase expensive card reader devices or software.

Figure 5:
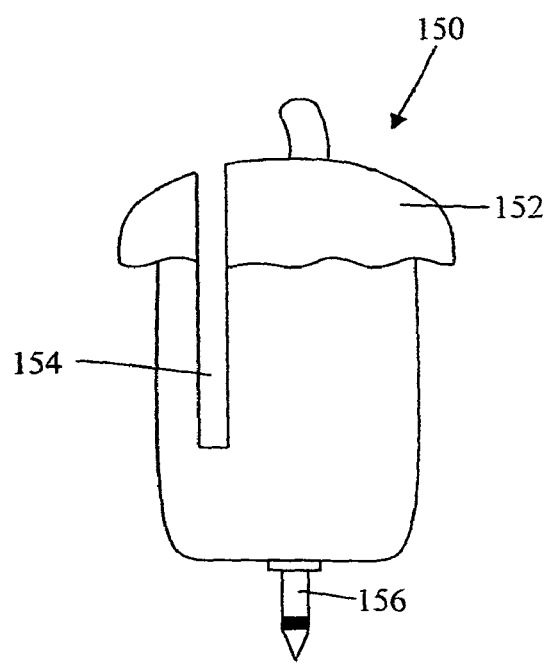
FIG. 5 is a perspective view of a card reader device constructed according to the present disclosure.

With particular reference now to FIG. 5, another embodiment of a card reader device 150 is shown. The card reader device 150 has a housing 152 that is in the shape of an acorn. The device 150 has a slot 154 that runs along a length or a width of the housing 152. The slot 154 has a depth that is deep enough to allow a magnetic stripe of a card to pass through the slot 154. The slot 154 has a length that can be less than the length of a card to be read. The device also has a jack 156 extending out of the housing 152. The device 150 may contain the components shown in either FIG. 2 or FIG. 3. In particular, the device 150 may be easily carried and connected to a cell phone when needed. The device 150 is also small enough that it may be easily stored when not in use. Other shapes, sizes, or designs for the card reader devices 10, 80, or 150 are possible and contemplated.

From all that has been said, it will be clear that there has thus been shown and described herein a card reader device which fulfills the various objects and advantages sought therefore. It will become apparent to those skilled in the art, however, that many changes, modifications, variations, and other uses and applications of the subject card reader device are possible and contemplated. All changes, modifications, variations, and other uses and applications which do not depart from the spirit and scope of the disclosure are deemed to be covered by the disclosure, which is limited only by the claims which follow.

What is claimed is:

1. A card reader device for reading a card having data stored on a magnetic stripe incorporated into the card the device comprising:
   a read head for passing a magnetic stripe of a card by to read data stored on a magnetic stripe and for producing a signal indicative of data stored on a magnetic stripe; and
   an output jack adapted to be inserted into a microphone input associated with a cell phone for providing the signal indicative of data stored on a magnetic stripe to a cell phone.

2. The card reader device of claim 1 wherein the read head is inductive.

3. The card reader device of claim 1 wherein the output jack comprises a 3.5 mm jack.

4. The card reader device of claim 1 wherein the signal indicative of data stored on a magnetic stripe is an analog signal.

5. The card reader device of claim 1 wherein the read head is contained within a housing.

6. The card reader device of claim 5 wherein the output jack extends out of the housing.

7. The card reader device of claim 5 wherein the housing comprises a slot into which a card having a magnetic stripe may be inserted and swiped.

8. The card reader device of claim 1 wherein the output jack comprises a 2.5 mm jack.

9. A portable card reader device for reading a card having magnetically recorded information stored on a magnetic stripe incorporated into the card, the device comprising:
- a read head for sensing magnetically recorded information stored on a magnetic stripe incorporated into a card and for producing an analog signal indicative of the magnetically recorded information stored on the magnetic stripe; and
- an output jack adapted to be inserted into an input associated with a cell phone for providing the analog signal indicative of the magnetically recorded information stored on the magnetic stripe to a cell phone for further processing.

10. The portable card reader device of claim 9 wherein the read head is inductive.

11. The portable card reader device of claim 9 wherein the read head is contained within a housing.

12. The portable card reader device of claim 11 wherein the housing comprises a slot into which a card having a magnetic stripe may be inserted and swiped.

13. The portable card reader device of claim 11 wherein the output jack extends out of the housing.

14. The portable card reader device of claim 9 wherein the output jack comprises a 3.5 mm jack.

15. The portable card reader device of claim 9 wherein the output jack comprises a 2.5 mm jack.

16. The portable card reader device of claim 9 wherein the input associated with a cell phone is a microphone input.

17. A method for reading a card having data stored on a magnetic stripe incorporated into the card, the method comprising the steps of:
- providing a card reader device comprising a read head for passing a magnetic stripe of a card by to read data stored on a magnetic stripe and for producing a signal indicative of data stored on a magnetic stripe, an output jack adapted to be inserted into a microphone input associated with a cell phone for providing the signal indicative of data stored on a magnetic stripe to a cell phone;
- passing a card having data stored on a magnetic stripe incorporated into the card by the card reader device; and
- providing the signal indicative of data stored on a magnetic stripe to a cell phone for processing by circuitry contained in a cell phone.

18. The method of claim 17 further comprising the step of providing a housing for containing the read head.

19. A method for reading a card having magnetically recorded information stored on a magnetic stripe incorporated into the card, the method comprising the steps of:
- providing a portable card reader device comprising read head for sensing magnetically recorded information stored on a magnetic stripe incorporated into a card and for producing an analog signal indicative of the magnetically recorded information stored on the magnetic stripe, and an output jack adapted to be inserted into an input associated with a cell phone for providing the analog signal indicative of the magnetically recorded information stored on the magnetic stripe to a cell phone;
- passing a card having magnetically recorded information stored on a magnetic stripe incorporated into the card by the portable card reader device; and
- providing the analog signal indicative of the magnetically recorded information stored on a magnetic stripe to a cell phone for further processing by circuitry contained in a cell phone.

20. The method of claim 19 further comprising the step of providing a housing for containing the read head.

\* \* \* \* \*

US007918394C1

(12) INTER PARTES REEXAMINATION CERTIFICATE (0340th)
United States Patent
Morley, Jr.

(10) Number: US 7,918,394 C1
(45) Certificate Issued: Jan. 17, 2012

(54) CARD READER DEVICE FOR A CELL PHONE AND METHOD OF USE

(76) Inventor: Robert E. Morley, Jr., University City, MO (US)

Reexamination Request:
No. 95/001,619, May 10, 2011

Reexamination Certificate for:
Patent No.: 7,918,394
Issued: Apr. 5, 2011
Appl. No.: 12/807,064
Filed: Aug. 26, 2010

Related U.S. Application Data

(63) Continuation of application No. 12/456,134, filed on Jun. 10, 2009, now Pat. No. 7,810,729.

(51) Int. Cl.
*G06K 7/08* (2006.01)
*G06K 7/00* (2006.01)

(52) U.S. Cl. .................. 235/449; 235/435; 235/439
(58) Field of Classification Search ................. None
See application file for complete search history.

(56) References Cited

To view the complete listing of prior art documents cited during the proceeding for Reexamination Control Number 95/001,619, please refer to the USPTO's public Patent Application Information Retrieval (PAIR) system under the Display References tab.

*Primary Examiner* — Margaret Rubin

(57) ABSTRACT

A card reader device for reading a card having data stored on a magnetic stripe incorporated into the card is disclosed in which the card reader device comprises a read head for passing a magnetic stripe of a card by to read data stored on a magnetic stripe and for producing a signal indicative of data stored on a magnetic stripe, a signal setting device for setting an amplitude of the signal indicative of data stored on a magnetic stripe, and an output jack adapted to be inserted into a microphone input associated with a cell phone for providing the signal indicative of data stored on a magnetic stripe to a cell phone. Data stored on the card and sensed by the card reader device is decoded by components such as a microphone amplifier, an analog to digital converter, and a microprocessor already resident in a cell phone.

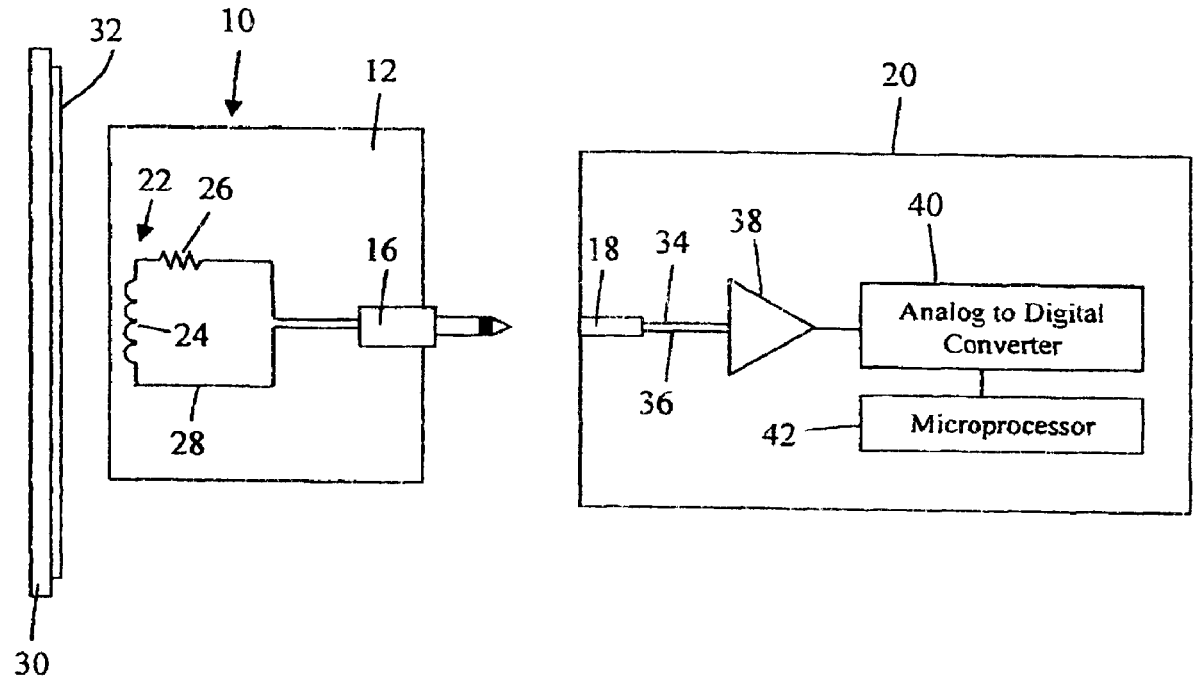

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *